Nov. 14, 1939. T. K. DORSETT 2,179,501

VACCINATOR

Filed Dec. 16, 1938

INVENTOR
Tracy K. Dorsett
BY
Adam Richmond
ATTORNEY

Patented Nov. 14, 1939

2,179,501

UNITED STATES PATENT OFFICE 2,179,501

VACCINATOR

Tracy K. Dorsett, Duncan Field,
San Antonio, Tex.

Application December 16, 1938, Serial No. 246,108

5 Claims. (Cl. 128—333)

(Granted under the act of March 3, 1883, as
amended April 30, 1928; 370 O. G. 757)

This invention described herein may be manufactured and used by or for the Government for governmental purposes, without the payment to me of any royalty thereon.

This invention relates to an improved vaccinator which in the science of medicine is used for inoculating human beings or animals with a medical preparation in order to prevent or mitigate an attack of disease.

One of the objects of the invention is to provide a vaccinator for the prevention or treatment of disease by the external application to the skin of a virus-destroying substance in such a manner that the substance will be infused into the skin immediately after the skin has been scratched by a needle or needles provided on the vaccinator.

Another object of the invention is to provide an adjustable nozzle on the vaccinator which is adapted to carry an adustably mounted needle for scratching the skin and at the same time to discharge a medical preparation onto the skin after having been scratched by the needle.

Another object of the invention is to provide a vaccinator which is simple in construction and operation, which provides means for starting the flow of a substance out of the vaccinator and after starting the flow of the substance to cause the substance to continue to flow automatically for each vaccination without leaking during the interval between the vaccinations.

With the above and other objects and advantages in view, the invention consists of certain features of construction and operation of parts which will hereinafter appear and in which—

Figure 1:
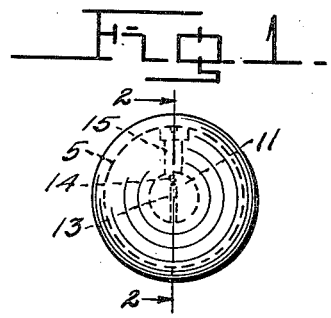
Fig. 1 is a front-end view of the invention.
Figure 2:
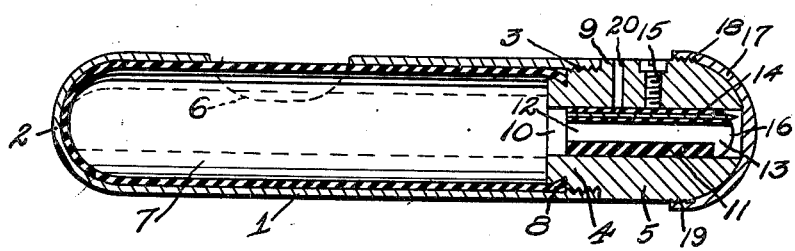
Fig. 2 is a vertical longitudinally-sectional view of the vaccinator taken on the line 2—2 of Fig. 1, showing the vaccinator in an inoperative condition.
Figure 3:
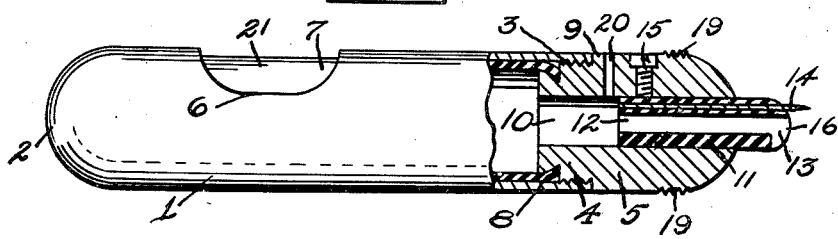
Fig. 3 is a side elevation partly in section of the vaccinator with a cover for the vaccinator removed and the nozzle and needle in an adjusted position ready for use.

In the illustrated embodiment characterizing the invention 1 indicates a hollow cylindrical casing formed of hard rubber, composition or other suitable material such as conditions or preference may dictate, one end of said casing being closed by the integral rounded end wall 2, and the other end thereof being open and internally screw-threaded at 3 for engagement with a peripherally screw-threaded reduced extension 4 of a head or plug 5, circular in cross section. The casing 1 is provided with an orifice 6 which extends partially around the casing for a purpose which will hereinafter appear.

Received within and extending throughout substantially the entire length of the hollow casing 1 is a syringe bag 7 formed of soft rubber or other compressible material, the open end or mouth portion 8 of the bag snugly engaging with the reduced extension 4 of the head 5. In this connection, it will be noted that the syringe bag 7 engages the inner wall of the casing 1 and that a shoulder 9 is formed adjacent the juncture of the nozzle head 5 with the casing 1 which shoulder is adapted to have abutting engagement with the adjacent marginal portion of the open end of the casing 1, whereby to limit the inward screw-threaded extent of engagement of the head 5 with the casing, and also to insure a fluid-type connection or jointure as between the head and the adjacent marginal portion of the open end of the casing 1.

The head 5 is provided with a central bore 10 which is formed longitudinally of and extends throughout the entire length of the head including the reduced extension 4 thereof which is engaged by the open end 8 of the syringe bag 7, whereby the fluid contents in the bag may enter the bore 10.

Figure 4:
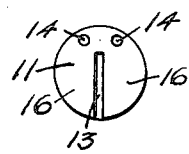
Fig. 4 is a front-end view of a modified form of nozzle containing two needles.

Slidably and adjustably mounted within the channel 10 of the head 5 is a nozzle 11 made of soft rubber or other suitable plastic material. The nozzle 11 is formed with a concentric way or duct 12 which extends longitudinally therethrough and terminates at the outer or discharge end in a slit 13 in the form of a partially closed fish-tail burner slit, whereby the fluid contents in the syringe bag 7 after entering the bore 10 of the head 5 may pass through the way or duct 12 of the nozzle 11 and thence pass through the slit 13 onto the object to be treated. The nozzle 11 carries a longitudinally extending needle 14 therethrough which projects outwardly from the closed portion of the slit 13 on the discharge end of the nozzle. The needle 14 may be pulled outwardly from the discharge end of the nozzle 11 or pushed inwardly for adjusting the length of the needle extending from the nozzle, depending on the depth of the scratch desired, the resiliency of the rubber nozzle holding the needle in adjusted position. The nozzle 11 may be provided with two needles 14, as illustrated in Fig. 4, or with any number of needles, if desired.

In order to hold the nozzle 11 in any adusted position in the bore 10 of the head 5, a set screw 15 is threadably mounted on the head 5 which set screw is adapted to engage with the outer peripheral surface of the nozzle 11. By adjustably mounting the nozzle 11 on the head 5, a greater or less protrusion of the nozzle from the head may be accomplished for various purposes, such as for instance, in engaging the skin of animals having an abundance of hair. After the needle 14 has been adjusted on the nozzle 11 and the nozzle has been adjusted on the head 5, the vaccine or other fluid may be applied and rubbed into the scratched skin by the portions 16 on the outer end of the nozzle 11, formed by the slit 13. The nozzle 11 being of soft rubber, the end portions 16 thereof act as a brush for applying the vaccine onto the skin.

To close and protect the nozzle carrying portion of the vaccinator from dust or the like, a cap 17 is provided on the device, said cap being internally screw-threaded at 18 and adapted to be turned into engagement with the externally arranged screw-threads 19 provided on the head 5. In order to prevent fluid from being held out of the duct or way 12 provided in the nozzle 11, due to vacuum being created therein, a small aperture 20 is formed in the head 5 which extends from the inner bore 10 of the head to the outer peripheral surface of the head and provides an opening for allowing air to enter the device.

In using the improved vaccinator, one need only to remove the cap 17 from the casing 1, thereby exposing the nozzle 11 carrying the needle 14. The nozzle 11 is then pulled outwardly until the inner end thereof is beyond the breather hole 20 of the head 5 and the needle 14 is also pulled outwardly or pushed inwardly with respect to the nozzle 11 to adjust its length of protrusion from the discharge end of the nozzle, depending on the depth of scratch desired to be produced on the skin by the needle. In order to prevent the scratching needle 14 from becoming contaminated when pulled outwardly or pushed inwardly with respect to the nozzle 11 to adjust its length of protrusion, it should be grasped by a pair of sterilized pliers or by any other suitable anesthetic device after the nozzle has been locked by the set screw 15 in an adjusted operated position in the bore 10. At this time, the syringe bag 7 may be filled with a medical preparation such as a virus-destroying substance to be used in the vaccinating operation by merely pressing with the thumb or finger on the portion 21 of the syringe bag 7 exposed by the orifice 6 provided in the casing 1, thus collapsing or partially collapsing the syringe bag. The outer end of the vaccinator is now immersed in the substance with which the syringe bag 7 is to be filled and the thumb or finger is removed from the orifice 6, whereupon the syringe bag will be allowed to expand and in so doing, will create a suction sufficient to draw a loaded charge of the fluid through the slit 13 on the outer end of the nozzle through the way 12 and thence through the rear end of the bore 10 of the head 5 into the bag 7. To repel or discharge the fluid from the syringe bag 7 the user again presses inwardly with the thumb or finger onto the portion 21 of the syringe bag 7 to effect a collapsing of the syringe bag, whereupon pressure will be applied to the contents of said bag and the same discharged therefrom into the rear end of the bore 10 of the head, through way 12 and the slit 13 of the nozzle 11 onto the part of the skin which has been scratched by needle 14. After the flow of the contents through the nozzle has once been started it will continue to flow automatically after each vaccination due to the opening 20 acting as a breather hole, without the opening the contents would be held out of the nozzle due to vacuum being created therein.

It will thus be seen that there is provided a highly novel and efficient form of vaccinator which is well adapted for all the purposes indicated and even though there has been herein described certain features of construction and operation of parts, it is nevertheless to be understood that various changes may be made therein without departing from the spirit or scope of the invention.

Having described my invention, what I claim as new and wish to secure by Letters Patent is:

1. A vaccinator comprising in combination a casing having an open end, a syringe bag received within said casing, a head engaged in said open end of the casing and with the mouth of said syringe bag, a bore and an air aperture formed in said head, said bore leading from an outer end of the head to the mouth of the syringe bag and said aperture leading into said channel and a needle carrying nozzle adjustably mounted in said bore, said casing having an orifice permitting finger pressure upon said syringe bag and causing the discharge of matter within the syringe bag through said nozzle.

2. A vaccinator comprising in combination a casing having an open end, a syringe bag received within said casing, a head engaged in said open end of the casing and with the mouth of said syringe bag, a bore and an air aperture formed in said head, said bore leading from an outer end of said head to the mouth of said syringe bag, and said aperture leading into said bore, a nozzle adjustably mounted in said bore and a needle adjustably mounted on said nozzle, said casing having an orifice permitting finger pressure upon said syringe bag and causing the discharge of matter within said syringe bag through said nozzle.

3. A vaccinator comprising in combination a casing having an open end, a syringe bag received within said casing, a head engaged in said open end of the casing and with the mouth of said syringe bag, a bore and an air aperture formed in said head, said bore extending from an outer end of the head to the mouth of the syringe bag, and said aperture leading into said bore, a nozzle adjustably mounted in the channel and having a slit formed on the discharged end thereof, needles adjustably mounted on the nozzle, a set screw for holding the nozzle in adjusted position, a cap engageable over the nozzle and with an adjacent portion of the head, said casing having an orifice permitting finger pressure upon said syringe bag and causing the discharge of fluid matter within said syringe bag through the nozzle.

4. A vaccinator comprising in combination an open-ended casing, a syringe bag received within said casing, a head removably engaged in the open end of the casing and with the mouth of said syringe bag, a bore and an air aperture formed in said head, said bore extending from an inner end of said head at the mouth of the syringe bag to an outer end of the head and said aperture leading into said bore, a nozzle adjustably mounted in the bore of said head, a partially closed slit formed on the discharge end of the nozzle and a needle adjustably mounted on said nozzle and extending outwardly from the discharge end thereof at the closed portion of said slit, said casing having an orifice permitting finger pressure upon said syringe bag and causing the discharge of fluid matter within said syringe bag through the nozzle.

5. A vaccinator comprising in combination an elongated barrel-like casing having an open end, a syringe bag received within said casing, a head removably engaged in said open end of the casing and with the mouth of said syringe bag, a shoulder formed on said head and adapted to have abutting engagement with the adjacent marginal portion of the open end of said casing, a bore and an air aperture formed in said head, said bore leading from an outer end of the head to the mouth of said syringe bag and said aperture leading into said bore, a nozzle adjustably and slidably mounted in said bore, means on said head for holding the nozzle in adjusted position, needles adjustably mounted on said nozzle, a slit formed on the discharge end of the nozzle, a cap engageable over said nozzle and with an adjacent portion of the head, said casing having an orifice permitting finger pressure upon said syringe bag and causing the discharge of matter within said syringe bag through an inner end of the bore of said head and the nozzle including the tip on the discharge end thereof..

TRACY K. DORSETT.